United States Patent [19]

Weber

[11] B 4,169,817

[45] Oct. 2, 1979

[54] LIQUID CLEANING COMPOSITION CONTAINING STABILIZED ENZYMES

[75] Inventor: Meyer M. Weber, Milwaukee, Wis.

[73] Assignee: Midwest Biochemical Corporation, Milwaukee, Wis.

[21] Appl. No.: 458,819

[22] Filed: Apr. 8, 1974

[44] Published under second Trial Voluntary Protest Program on Apr. 13, 1976 as document No. B 458,819

Related U.S. Application Data

[63] Continuation-in-part of Ser. No. 211,755, Dec. 23, 1971, abandoned, which is a continuation-in-part of Ser. No. 852,079, Aug. 21, 1969, abandoned.

[51] Int. Cl.$^2$ ............................................... C11D 7/42
[52] U.S. Cl. .............................. 252/545; 252/174.12; 252/526; 252/546; 252/547; 252/DIG. 12; 252/DIG. 14
[58] Field of Search ................. 252/89, DIG. 12, 545, 252/546, 547, DIG. 14, 526; 195/63, 68, DIG. 11

[56] References Cited

U.S. PATENT DOCUMENTS

| | | | |
|---|---|---|---|
| 3,296,094 | 1/1967 | Cayle | 195/63 |
| 3,346,504 | 10/1967 | Herrmann | 252/526 |
| 3,519,570 | 7/1970 | McCarty | 252/DIG. 12 |
| 3,557,002 | 1/1971 | McCarty | 252/89 |
| 3,575,864 | 4/1971 | Innerfield | 252/89 R |
| 3,627,688 | 12/1971 | McCarty et al. | 252/153 |
| 3,676,374 | 7/1972 | Zaki et al. | 252/551 |
| 3,697,451 | 10/1972 | Mausner et al. | 252/545 |
| 3,860,536 | 1/1975 | Landwerlen et al. | 252/551 |

OTHER PUBLICATIONS

K. Yasumatsu et al., Agr. Biol. Chem., vol. 29, No. 7, pp. 665–671, Jul. 1954.

*Primary Examiner*—Thomas J. Herbert, Jr.
*Attorney, Agent, or Firm*—Andrus, Sceales, Starke & Sawall

[57] ABSTRACT

A liquid cleaning composition containing stabilized enzymes. The composition is an aqueous solution containing from 10% to 50% by weight of solids and including detergent builders, surface active agents, an enzyme system derived from *Bacillus subtilis* and an enzyme stabilizing agent. The stabilizing agents comprise highly water soluble sodium or potassium salts and/or water soluble hydroxy alcohols and enable the solution to be stored for extended periods without deactivation of the enzymes.

16 Claims, No Drawings

LIQUID CLEANING COMPOSITION CONTAINING STABILIZED ENZYMES

This application is a continuation-in-part of application Ser. No. 211,755, filed Dec. 23, 1971, now abandoned which in turn is a continuation-in-part of application Ser. No. 852,079, filed Aug. 21, 1969, now abandoned.

BACKGROUND OF THE INVENTION

Recently dry laundry detergents have been developed which contain enzymes which are highly effective not only against proteinaceous soils, such as blood, gravy and the like, but are also effective against carbohydraceous and fatty soils. In some cases enzymes have been added to dry detergent compositions to be used as a presoak prior to washing, while in other cases the enzymes have been added to the dry washing composition itself. With an enzyme-containing detergent composition it is a necessary requirement that the enzyme remain stable for extended periods of time of at least up to 12 months at ordinary temperatures. Because of this requirement of stability, enzymes in the past have only been incorporated with dry detergent compositions. In liquid or aqueous compositions, enzymes have a tendency to deactivate either through reversible inactivation or through irreversible activation in which chemical changes occur in the enzyme structure to prevent further activity.

The inherent instability of enzymes in liquid detergent solutions is due to several factors, first an aqueous phase in itself is a hostile environment for the enzymes, and while stabilized aqueous enzyme solutions have been prepared in the past, these stabilized solutions have had an acidic or neutral pH and not a highly alkaline pH as in an aeuqous detergent solution. Further, the surfactants, detergent builders and chelating agents commonly used in detergent or laundry compositions are hostile to the enzyme in that they tend to be toxic to the enzyme protein. For these reasons, enzymes have been used exclusively with dry detergent compositions in the past.

SUMMARY OF THE INVENTION

The present invention is directed to an aqueous detergent or laundry composition containing stabilized enzymes so that the composition can be stored for extended periods without inactivation of the enzymes.

In general, the detergent composition is an aqueous solution containing in the range of 10 to 50% of solids and includes a detergent builder such as water soluble, inorganic phosphates, nitrilo tetra acetic acid or ethylene diamine tetra acetic acid; a surface active agent; an enzyme stabilizing agent; and an enzyme system derived from *Bacillus subtilis*. The presence of the enzymes increases the effectiveness of the composition against proteinaceous and carbohydraceous soils.

It is believed that the specific combination of ingredients acts to dehydrate and maintain the configuration of the enzyme molecule, and thus the aqueous composition has substantially improved stability, enabling the composition to be stored at room temperatures for extended periods, up to a year or more, without appreciable deactivation of the enzymes.

DESCRIPTION OF THE PREFERRED EMBODIMENT

The detergent composition of the invention has the following formulation in weight percent:

| | |
|---|---|
| Detergent builders | 2-25 |
| Surface active agent | 5-30 |
| Enzyme stabilizing agent | 5-40 |
| Enzyme system | 0.1-5 |
| Water | balance |

The detergent builders can take the form of water soluble inorganic phosphates, nitrilo tetra acetic acid, ethylene diamine tetra acetic acid, the combination of sodium metasilicate and sodium carbonate, or mixtures thereof. Examples of phosphates that can be employed are trisodium phosphate, tetrasodium pyrophosphate, sodium hexametaphosphate, sodium tripolyphosphate, and the like. The potassium derivatives of the above phosphates can be employed with equal results. Other alkali metals, such as lithium and cesium can also be used, but generally the sodium and potassium phosphates are preferred because they are relatively inexpensive and readily available.

The water soluble alkali metal salts of nitro tetra acetic acid and ethylene diamine tetra acetic acid, such as the sodium or potassium salts, can be substituted for the acids.

Other water soluble, alkali metal salts, such as the potassium salts, can be substituted for the sodium metasilicate and sodium carbonate.

Examples of the surface active agents which can be employed are alkali metal alkyl sulfates, designated by the formula $ROSO_3X$ where R is an aliphatic hydrocarbon having a carbon range of 10 to 18, and including both saturated and unsaturated forms, and X is an alkali metal selected from the group consisting of sodium, potassium, lithium and the like. A specific example is sodium lauryl sulfate.

Another group of surfactants which can be employed is the alkali metal alkylol sarcosinates which have the general formula $RCON(CH_3)CH_2COOX$ where R is an aliphatic hydrocarbon group having a carbon content of 12 to 18 and X is a hydrogen atom or a water soluble salt forming cation such as sodium, potassium, lithium and the like.

Acetylenic glycols, such as those disclosed in the U.S. Pat. No. 2,997,447 can also be used as the surfactant.

Other detergents or surfactants which can be employed are the water soluble higher alkyl aryl sulfonates, particularly those having about 8 to 15 carbon atoms in the alkyl group. It is preferred to use the higher alkyl benzene sulfonate detergent for optimum effects, though other similar detergents having a mononuclear aryl nucleus such as toluene, xylene, or phenol may be used also. The higher alkyl substituent on the aromatic nucleus may be branched or straight-chained in structure, examples of such groups being nonyl, decyl, dodecyl, tridecyl, and pentadecyl groups derived from polymers of lower mono-olefins, decycl, keryl, and the like.

The sulfate and sulfonate detergents are used in the form of their water soluble salts, such as the alkali metal and nitrogen-containing, e.g. lower alkylolamine salts. Examples are the sodium, potassium, isopropanolamine, mono- and tri-ethanolamine salts of said higher alkyl benzene sulfonate, higher alkyl sulfate and the like. In commercial practice, it is preferred to use the alkali metal salts.

Further suitable non-ionic detersive materials are the higher fatty acid alkanolamides, such as the monoethanolamides, diethanolamides and isopropanolamides wherein the acyl radical has about 10 to 18 carbon atoms. Examples are coconut (or equivalent lauric), capric and myristic diethanolamide, monoethanolamide and isopropanolamide.

The stabilizing agents comprise highly water soluble salts and/or water soluble hydroxy alcohols. The water soluble salts can take the form of sodium or potassium sulfates or chlorides, preferably the sulfates, while the hydroxy alcohols can be selected from glycerol, alkylene glycols in which the alkylene group contains from 2 to 8 carbon atoms, such as ethylene glycol, propylene glycol, butylene glycol, hexylene glycol, sorbitol and the like.

When the solution contains a high concentration, generally above 20% by weight, of ionized active ingredients or salts, such as phosphates, alkali metal alkyl sulfates, sarcosinates, and the like, the enzymes are more stable because the high ion concentration inhibits microorganism growth which could destroy the enzymes and also reduces the amount of water which is available so that there is a lesser chance of hydrolyzation of the enzymes. Thus, a lesser proportion of the stabilizing agents; i.e., water soluble sulfates or hydroxy alcohols, are required for enzyme stabilization. However, when lesser amounts of such active ionized ingredients are employed, in the solution, an increased amount of the enzyme stabilizing agent is required.

Depending on the nature of the active ingredients the pH of the solution is generally within the range of 7.0 to 11.0, and the enzyme system utilized is an alkaline protease such as produced from a select strain of Bacillus subtilis. The Bacillus subtilis can be produced either by a submerged fermentation process or a solid substrate process. The alkaline protease derived from Bacillus subtilis is employed with a concentration generally in the range of 500 to 10,000 Delft units per gram of solution. Employing a concentration of less than 500 units of the alkaline protease will not produce any significant effect while a concentration of over 10,000 units provides no particular advantage and is uneconomical. Upon final dilution at the time of use, the wash water should preferably contain from 10 to 500 Delft units per gram of water.

The detergent solution can also contain small amounts, up to 5% by weight of anti-corrosion agents such as sodium metasilicate; oil and fat solubilizers such as methyl pyrolidone, butylcellosolve, naphtha, or glycol monobutyl ether; soil suspending agents such as carboxymethyl cellulose or polyvinyl pyrrolidone; fabric softeners such as various imidazolines, amphoterics and certain quaternary ammonium compounds illustrated by dimethyl ammonium methyl chloride, or alkyl trimethyl ammonium chloride where the alkyl group contains 12 to 20 carbon atoms; preservatives; coloring agents; perfumes; and the like.

The presence of the enzymes in the liquid detergent composition increase the effectiveness of the composition against proteinaceous and carbohydraceous soils. The enzymes act to digest or break down the soil into water soluble fractions which are then dissolved in the aqueous phase of the composition.

The detergent composition can be employed either as a pre-soak in which the laundry or other articles to be cleaned are soaked in the solution prior to laundering, or the detergent composition can be employed as the washing composition itself. In either case, the enzymes act in removing tenaceous soils to thereby increase the effectiveness of the cleaning operation.

In addition, the enzyme-containing liquid detergent composition has a particular and important use in cleaning semi-permeable membranes used in reverse osmosis processes. The membranes are generally composed of cellulose acetate, and the detergent composition can be utilized in a clean-in-place operation to remove clogged material from the pores of the membrane.

The detergent composition can also be used as a general purpose cleaner, as for example, cleaning processing equipment in the dairy and cheese-making industries.

The precise mechanism by which the Bacillus subtilis enzymes are stabilized in the aqueous solution is not completely understood. It is believed that the high concentration of the ionizable salts and/or the hydroxy alcohols act to dehydrate the active sites on the enzyme as well as maintaining or protecting the physical configuration of the enzyme protein and in this dehydrated and protected condition the enzyme is stable. On dilution at the time of use, the enzyme will be hydrated and activated.

The aqueous detergent solutions can be prepared by merely mixing the detergent builder, surface active agent and stabilizer with water to provide a solution and then adding the enzyme system.

The following examples illustrate detergent compositions prepared in accordance with the invention.

The following aqueous solutions were prepared and the percentage of enzyme activity was determined for each solution after a one year period of storage at room temperature. The concentrations of the various ingredients are given in grams per 100 gr. of solution in the following table:

Table I

| | Solution | | | | | | | |
| --- | --- | --- | --- | --- | --- | --- | --- | --- |
| | 1 | 2 | 3 | 4 | 5 | 6 | 7 | 8 |
| Sodium tripolyphosphate | 10 | — | — | — | — | — | — | 10 |
| Sodium hexametaphosphate | 5 | — | — | — | — | — | — | 5 |
| Sodium sulfate | 14 | — | — | — | — | — | — | — |
| Sodium metasilicate | — | — | — | — | — | — | 5 | — |
| Sodium carbonate | — | — | — | — | — | — | 10 | — |
| Nitrilo acetic acid | — | — | 5 | 5 | 5 | 5 | — | — |
| Ethylene diamine tetra acetic acid | — | 2 | — | — | — | — | — | — |
| Glycerine | — | — | — | — | — | — | 20 | 30 |
| Propylene glycol | — | 30 | 30 | 30 | 30 | 30 | — | — |
| Polypeptide | — | — | — | — | — | — | — | 5 |
| Sodium lauryl sarcosinate (30%) | 5 | — | — | — | — | — | — | 5 |
| Octyl phenoxy polyethoxy ethanol | — | 10 | 10 | 10 | — | 10 | — | — |
| Sodium salt of linear dodecyl benzene sulfate | — | — | — | — | 10 | — | — | — |

Table I-continued

| | Solution | | | | | | | |
|---|---|---|---|---|---|---|---|---|
| | 1 | 2 | 3 | 4 | 5 | 6 | 7 | 8 |
| Glycol monobutyl ether | — | 5 | 5 | — | — | — | — | — |
| Glycol methyl ether | — | — | — | 5 | — | — | — | — |
| Di-tallow dimethyl ammonium methyl sulfate | — | 2 | 2 | 2 | — | — | — | — |
| Naphtha | — | — | — | — | — | 10 | — | — |
| Sodium lauryl sulfate | — | — | — | — | — | — | 10 | — |
| Protease of Bacillus subtilis | 2* | 2* | 2* | 2* | 2* | 2* | 2* | 2* |
| pH | 9.0 | 8.5 | 8.5 | 8.5 | 8.5 | 8.5 | 10.5 | 11.1 |
| Percent enzyme activity after one year | 60 | 90+ | 90+ | 90+ | 90+ | 90+ | 72 | 90+ |

*approximately 6,000 Delft units per gram of solution

The results shown in the above table indicate the effectiveness of the enzyme stabilization, enabling the solutions to be stored for extended periods up to a year with very little deactivation of the enzymes, while the addition of enzymes to conventional liquid detergent compositions would normally render the enzymes inactive in a period of several weeks at the most.

EXAMPLES 9-22

The cleaning properties of the invention can be further described by evaluating the cleaning performance of various compositions on various substrates provided with various standardized soils and stains.

For example, two standard white cloth substrates, one comprised of 100% cotton and the other of (50% cotton and 50% polyester) were washed in a hot solution containing a commercial soap and then dried. A series of cleaning standards were then prepared to treat these substrates as follows:

A detergency standard was prepared by mixing 5 gms. of floor sweepings through a 30 mesh screen, with 5 gms. of lignin sulfate and 5 gms. of corn oil in 85 gms. of water. The resulting suspension was maintained agitated and a series of 12×3 inch swatches of the two substrates were immersed in the suspension for 10 to 15 seconds each and then removed and dried while lying flat on brown paper for 2 days.

A wetting standard was prepared by mixing 10 gms. of gelatin and 10 gms of milk solids with 80 gms of water. The resulting solution was held at 40° C. and a series of 12×3 inch s swatches of the two substrates were immersed in the solution, squeezed dry and hung on a line overnight to dry.

A stain standard was prepared using citrated cows blood. A series of 12×3 inch swatches of the two substrates were immersed in the blood, the excess drained off and the swatches were then dried at ambient conditions. The stained cloths were then dipped in the blood again with the excess drained off and and allowed to dry at ambient conditions. The swatches were then immersed in a water bath at 70° C. for 60 seconds and then rinsed in warm water and dried at ambient conditions overnight.

The cleaning performance of various composition were then evaluated by placing 1×2 inch swatches of the various treated substrates in an Erlenmeyer flash containing 1% by volume of each composition evaluated and 99% by volume tap water. The flask was placed in a water bath at 45° C. for 20 hours. The swatches were then removed and rinsed in clean warm water and dried at ambient temperatures for approximately 4 hours and then readings were taken. All tests were run in triplicate on each type of substrate. Cleaning performance readings in the specific areas of detergency, wetting and stain removal were made on a 1-10 scale as follows:

| Scale Reading | Detergency | Wetting | Stain |
|---|---|---|---|
| 1. | No observable soil removed | No observable soil removed | No observable stain removed |
| 2. | — | — | Very slight stain removal |
| 3. | Slight removal of oil soil | — | Slight stain removal |
| 5. | — | — | Slight to moderate color of stain about halfway between original stain color and unstained substrate |
| 6. | Substrate fairly clean few stains spots remaining | Substrate appears white but on drying not totally pliable | Slightly lighter in color than 5 |
| 7. | Substrate fairly clean with a few soil spots | — | — |
| 8. | Slight color with occasional soil spots | Substrate is white and pliable but rate of results is slower than 9 and 10 | Slight color with most stain removed |
| 9. | Slight shadow of color remaining | Substrate is white and pliable but rate of result is slower than 10 | Most of stain removed substrate not pure white. |
| 10. | Substrate as white as original | Substrate as white as original | Substrate as white as original |

The 6-month stability performance of these solutions was determined by heating the composition of 80° C. for 1 hour and then reassaying the enzyme activity. Then a 1% by volume solution was prepared and used for evaluating the cleaning performance of the composition using the standards and methods described above. Thus, the following examples also illustrate the cleaning performance of certain compositions of the invention initially and on a projected basis, 6-months after preparation.

For the purpose of the present invention, initial cleaning performance is defined as the sum of the initial protease activity, detergency, wetting and stain removal values. The compositions of the invention are characterized by initial cleaning performance values ranging from about 115 to 130. In a preferred embodiment, the compositions of the invention are characterized by initial cleaning performance values from about 120 to 130.

For the purpose of the present invention, 6-month cleaning performance is defined as the sum of the 6-month protease activity, detergency, wetting and stain removal values. The compositions of the invention are characterized by 6-month cleaning performance values ranging from about 65 to 130. In a preferred embodiment, the compositions of the invention are characterized by 6-month cleaning performance values ranging from about 90 to 130.

For the purpose of the present invention, the cleaning performance differential is defined as the difference between the initial cleaning performance and the 6-month cleaning performance It has been observed that the compositions of the invention are characterized by a cleaning performance differential up to about 65. In a preferred embodiment of the invention, the cleaning performance differential can range up to about 40.

In the following examples, the ionic detergent builder is nitrilotriacetic acid, the water-soluble surface active agent is a linear alkyl aryl sulfonate, the water-soluble alkaline protease having an activity of about 2500 Delft units/gm, the enzyme stabilizing agent is propylene glycol and the water is tap water. The concentrations of these various ingredients are given in grams per 100 gt. of solution. The enzyme content is defined as the percent activity remaining.

TABLE II
EXAMPLES 9-22

| Ex. No. | Component-Percentage By Weight ||||| Enzyme Content ||| Cleaning Performance |||||||||
|---|---|---|---|---|---|---|---|---|---|---|---|---|---|---|---|---|
| | Ionic Detergent Builder | Water Soluble Surface Active Agent | Water Soluble Alkaline Protease | Enzyme Stabiliz-ing Agent | Tap Water | Initial | Six Month | Initial |||| Six Month |||| C* P D. |
| | | | | | | | | Detergent | Wetting | Stain Removal | Initial Cleaning Perfor-mance | Detergent | Wetting | Stain Removal | Six Month Calendar Perfor-mance | |
| 9 | | | | | 100 | 100 | 5 | 3 | 6 | 1 | 10 | 3 | 6 | 1 | 10 | 0 |
| 10 | | | 2 | | 98 | | | 3 | 8 | 3 | 114 | 3 | 8 | 2 | 18 | 96 |
| 11 | | | | 30 | 70 | | | 3 | 6 | 1 | 10 | 3 | 6 | 1 | 10 | 0 |
| 12 | | | 2 | 30 | 68 | 100 | 93 | 3 | 8 | 3 | 114 | 3 | 8 | 3 | 107 | 7 |
| 13 | | | 2 | 10 | 88 | 100 | 58 | 3 | 8 | 3 | 114 | 3 | 9 | 2 | 71 | 43 |
| 14 | 5 | | 2 | 30 | 63 | 100 | 90 | 7 | 9 | 6 | 122 | 7 | 8 | 6 | 112 | 10 |
| 15 | 5 | | 2 | | 93 | 100 | 2 | 7 | 8 | 5 | 120 | 7 | 9 | 2 | 17 | 103 |
| 16 | | 6 | 2 | 30 | 62 | 100 | 88 | 7 | 9 | 3 | 119 | 7 | 8 | 3 | 107 | 12 |
| 17 | | 6 | 2 | | 92 | 100 | 2 | 7 | 8 | 6 | 121 | 7 | 9 | 3 | 18 | 103 |
| 18 | 5 | 6 | 2 | 30 | 59 | | | 10 | 9 | 5 | 24 | 10 | 9 | 5 | 24 | 0 |
| 19 | 5 | 6 | 2 | 30 | 57 | 100 | 91 | 10 | 10 | 10 | 130 | 10 | 10 | 10 | 130 | 0 |
| 20 | 5 | 6 | 2 | | 87 | 100 | 2 | 8 | 9 | 9 | 126 | 8 | 9 | 6 | 23 | 103 |
| 21 | 2 | 2 | 2 | 10 | 84 | 100 | 62 | 9 | 10 | 9 | 128 | 9 | 10 | 8 | 89 | 39 |
| 22 | 2 | 2 | 2 | | 99 | 100 | 2 | 6 | 8 | 3 | 117 | 6 | 8 | 2 | 16 | 101 |

*CPD. = Cleaning Performance Differential

The results in the above table indicate the effectiveness of the enzyme stabilization enabling the compositions of the invention to have acceptable cleaning performance after 6 months. In addition, the synergy between the enzymes, the ionic detergent builder and the stabilizing agent is illustrated.

The percent solids includes all nonaqueous ingredients.

TABLE III

EXAMPLES 23-26

| Ex. No. | pH | % Solids | Ionic Detergent Builder | Water Soluble Surface Active Agent | Water Soluble Alkaline Protease [activity in Delft units] | Enzyme Stabilizing Agent | Foam Stabilizer | Substantive Agent | Other Additives | Tap Water |
|---|---|---|---|---|---|---|---|---|---|---|
| 23 | 7.0 | 40 | Sodium salt of ethylene diamine tetraacetic acid (1) | Sodium lauryl sulfate (6) Sodium lauryl ether sulfate(6) Alkyl amido sulfo-succinate sodium salt (1.5) | Bacterial protease (2) [4000-6000] | Propylene glycol (20) | coco amido Propyl di-methyl amine oxide (1.5) | polypeptide (0.5) [hydrolyzed gelatin] | Perfume Sodium chloride Citric acid Dye (1.5) | 60 |
| 24 | 7.5 | 20 | Sodium salt of nitrilo triacetic acid(0.5) | alpha olefin sulfonate (4) | Bacterial protease(3) [8000-10,000] | Glycerol (10) | akanol-amide (0.4) | alkyl dimethyl Perfume betaine | 80 (0.1) imidazoline, butyl cellulose (2.0) | Citric acid |
| 25 | 7.3 | 60 | Sodium salt of ethylene diamine tetra acetic acid(3) | Sodium lauryl sulfate(6) Sodium lauryl ether sulfate(6) alkyl amido sulfo-succinate sodium salt (3) | Bacterial protease(5) [10,000-15,000] | Propylene glycol (40) | Coco amido propyl di-methyl amine oxide (3) | Hydrolyzed gelatine (2.0) | Perfume Sodium chloride Citric acid Dye (4.0) | 40 |
| 26 | 7.0 | 20 | Sodium salt of ethylene diamine tetra acetic acid(0.5) | Sodium lauryl sulfate (2) Sodium lauryl ether sulfate(2) alkyl amido sulfo-succinate sodium salt (1) | Bacterial Protease(1) [500 - 4,000] | Propylene glycol (11.5) | Alkanolamid (0.5) | Hydrolized gelatin(0.5) | Perfume Sodium chloride Citric Acid Dye (1.0) | 80 |

EXAMPLES 23-26:

The following examples of the invention describe compositions which are particularly suited for cleaning substrates comprised of various animal and protein fibers such as wool and hair. For example, various woolen garments and wigs generally require a mild cleaning solution and are preferably washed in cold water. The mild, cold water wash compositions of the invention containing stabilized enzymes can be characterized as having high solids, a pH from about 7.0 to 7.5 and containing a foam stabilizer, a substantive agent and a minimum of ionic detergent builder.

The cold water wash compositions of the invention generally have a pH from 7.0 to about 7.5, from about 20% to 60% solids and the following formulation in weight percent:

| | |
|---|---|
| Ionic Detergent building | 0.5-5 |
| Water soluble surface active agent | 6.0-20 |
| Water soluble alkaline protease | 0.1-5 |
| Enzyme stabilizing agent | 5.0-40 |
| Foam stabilizer | 0.5-3 |
| Substantive agent | 0-3 |
| Other additives | 0-6 |
| Water | Balance |

The concentrations of these various ingredients are given in parenthesis in grams per 100 grams of solution.

Various modes of carrying out the invention are contemplated as being within the scope of the following claims particularly pointing out and distinctly claiming the subject matter which is regarded as the invention.

I claim:

1. An aqueous cleaning composition containing stabilized enzymes enabling the composition to be stored for extended periods without appreciable deactivation of the enzymes, comprising an aqueous solution containing 10% to 50% by weight of solids and having a pH in the range of 7.0 to 11.0 and consisting essentially by weight of (a) 2% to 25% of an ionic detergent builder selected from the group consisting of water soluble inorganic phosphates, nitrilotriacetic acid, water soluble alkali metal salts of nitrilotriacetic acid, ethylene diamine tetra acetic acid, water soluble alkali metal salts of ethylene diamine tetra acetic acid, and the combination of an alkali metal metasilicate and an alkali metal carbonate, (b) 5% to 30% by weight of a water-soluble surface active agent selected from the group consisting of an alkali metal alkyl sulfate where the alkyl group contains from 10 to 18 carbon atoms, an alkali metal alkylol sarcosinate where the alkylol group contains from 11 to 18 carbon atoms, an acetylenic glycol, an alkyl aryl sulfonate where the alkyl group contains from 8 to 15 carbon atoms, a fatty acid alkanolamide where the acyl radical has from 10 to 18 carbon atoms, and mixtures thereof, (c) 0.1% to 5% by weight of a water-soluble alkaline protease, (d) 5% to 40% by weight of an enzyme stabilizing agent selected from the group consisting of alkali metal sulfates, alkali metal chlorides, glycerol and alkylene glycols having from 2 to 8 carbon atoms in the alkylene group, and (e) the balance water.

2. The composition of claim 1, wherein the ionizable ingredients of said composition comprise more than 20% by weight of the composition.

3. The composition of claim 1, wherein said aqueous solution has an enzyme concentration of 500 to 10,000 Delft units per gram of solution.

4. The composition of claim 1, and including a water soluble material selected from the group consisting of gelatin, hydrolyzed gelatin, meat peptones, soluble plant protein, polypeptides, and hydrolyzed plant and animal protein, said material being present in an amount up to 20% by weight of the composition.

5. The composition of claim 1, wherein said alkaline protease is derived from *Bacillus subtilis*.

6. An aqueous cleaning composition consisting essentially by weight of: (a) 5% of the sodium salt of nitrilotriacetic acid, (b) 6% dodecyl benzene sulfonate, (c) 2% water soluble alkaline protease having an activity of about 2500 Delft units/gm. (d) 30% propylene glycol, and (e) 59% water, said composition having an initial cleaning performance value of 130 and a six month cleaning performance of 130 with a cleaning performance differential of 0.

7. A cold water wash composition, having a pH of about 7.0 and consisting essentially by weight of: 1% of the sodium salt of ethylene diamine tetraacetic acid, 6% of sodium lauryl sulfate, 6% sodium lauryl ether sulfate, 1.5% alkylamide sulfo succinate amid salt, 2% soluble alkaline protease having an activity from about 4000 to about 6000 Delft units/gm., 20% propylene glycol, 1.5% cocoaamido propyl dimethyl amine oxide, 0.5% polypeptides, 1.5% of an additive selected from the group consisting of perfume, sodium chloride, and citric acid, and 60% water, said composition having a cleaning performance differential up to 65.

8. An aqueous cleaning composition containing from about 20% to about 60% solids and consisting essentially by weight of: (a) an ionic detergent builder selected from the group consisting of water soluble inorganic phosphates, nitrilotriacetic acid, water soluble alkali metal salts of nitrilotriacetic acid, ethylene diamine tetra acetic acid, and the combination of an alkali metal metasilicate and an alkali metal carbonate, (b) a water-soluble surface active agent selected from the group consisting of an alkali metal alkyl sulfate where the alkyl group contains from 10 to 18 carbon atoms, an alkali metal alkylol sarcosinate where the alkylol group contains from 11 to 18 carbon atoms, an acetylenic glycol, an alkyl aryl sulfonate where the alkyl group contains from 8 to 15 carbon atoms, a fatty acid alkanolamide where the acyl radical has from 10 to 18 carbon atoms, and mixtures thereof, (c) a water-soluble alkaline protease, (d) an enzyme stabilizing agent selected from the group consisting of alkali metal sulfates, alkali metal chlorides, glycerol and alkylene glycols having from 2 to 8 carbon atoms in the alkylene group, and (e) water, said composition having a cleaning performance differential up to 65.

9. The composition of claim 8, wherein the ionizable ingredients of said composition comprise more than 20% by weight of the composition.

10. The composition of claim 8, wherein said aqueous solution has an enzyme concentration of 500 to 10,000 Delft units per gram of solution.

11. The composition of claim 8, and including a water soluble material selected from the group consisting of gelatin, hydrolyzed gelatin, meat peptones, soluble plant protein, polypeptides, and hydrolyzed plant and animal protein, said material being present in an amount up to 20% by weight of the composition.

12. The composition of claim 8, wherein said alkaline protease is derived from *Bacillus subtilis*.

13. The composition of claim 8, wherein said composition has an initial cleaning performance value of about 115 to 130 to a six month cleaning performance value of about 65 to 130.

14. The composition of claim 8, having an initial cleaning performance value from about 115 to 130 and a 6 month cleaning performance value from about 65 to 130.

15. The composition of claim 8, containing a foam stabilizer.

16. The composition of claim 15, and containing a fabric softener, an oil and fat solubilizer and a substantive agent.

* * * * *

UNITED STATES PATENT AND TRADEMARK OFFICE
CERTIFICATE OF CORRECTION

PATENT NO. : 4,169,817
DATED : October 2, 1979
INVENTOR(S) : MEYER MICHAEL WEBER It is certified that error appears in the above-identified patent and that said Letters Patent are hereby corrected as shown below:

Columns 11 and 12, Table III, EX. 24, under the heading "Substantive Agent" cancel "Perfume" and after "betaine" insert -- (0,1) --; EX.No.24, under the heading "Other Additives", cancel "80", cancel "(0.1), above "imidazoline" insert ---Perfume, citric acid---; EX.No.24, under the heading "Tap Water" cancel "Citric acid" and insert ---80---.

Signed and Sealed this

Fifth Day of February 1980

[SEAL]

Attest:

Attesting Officer

SIDNEY A. DIAMOND

Commissioner of Patents and Trademarks